US010201764B2

(12) United States Patent
Oh (10) Patent No.: US 10,201,764 B2
(45) Date of Patent: Feb. 12, 2019

(54) GIANT CHILDREN'S FOAM BLOCKS MOLDED AROUND A RIGID INNER CORE

(71) Applicant: Zinus Inc., San Leandro, CA (US)

(72) Inventor: Suk Kan Oh, Xiamen (CN)

(73) Assignee: Zinus Inc., Tracy, CA (US)

( * ) Notice: Subject to any disclaimer, the term of this patent is extended or adjusted under 35 U.S.C. 154(b) by 862 days.

(21) Appl. No.: 14/320,603

(22) Filed: Jun. 30, 2014

(65) Prior Publication Data

US 2015/0202541 A1 Jul. 23, 2015

(30) Foreign Application Priority Data

Jan. 23, 2014 (CN) .............................. 20140031361

(51) Int. Cl.
*A63H 33/04* (2006.01)
*B29C 45/14* (2006.01)
*B29C 45/16* (2006.01)
*B29C 44/12* (2006.01)
*B29L 9/00* (2006.01)
*B29L 31/00* (2006.01)
*B29K 75/00* (2006.01)
*B29K 105/04* (2006.01)
*B29L 31/52* (2006.01)

(52) U.S. Cl.
CPC ......... *A63H 33/04* (2013.01); *B29C 44/1285* (2013.01); *B29C 45/14008* (2013.01); *B29C 45/14795* (2013.01); *B29C 45/14819* (2013.01); *B29C 45/1671* (2013.01); *B29K 2075/00* (2013.01); *B29K 2105/04* (2013.01); *B29K 2995/007* (2013.01); *B29L 2009/005* (2013.01); *B29L 2031/529* (2013.01); *B29L 2031/7722* (2013.01)

(58) Field of Classification Search
CPC ... B29C 44/04; B29C 44/569; B29C 44/1285; B29C 45/14795; B29C 45/14819; B29C 45/1671; B29C 45/14008; C08J 9/34; A63H 33/04; B29K 2995/007; B29K 2105/04; B29K 2075/00; B29L 2031/529; B29L 2031/7722; B29L 2009/005
USPC ...................................................... 52/309.4
See application file for complete search history.

(56) References Cited

U.S. PATENT DOCUMENTS 3,644,168 A * 2/1972 Bonk et al. .................... 442/213
4,164,526 A * 8/1979 Clay et al. .................... 264/45.3
4,207,636 A * 6/1980 Ceriani ........................ 428/101
4,598,909 A * 7/1986 Ventura et al. ............... 473/594

(Continued)

*Primary Examiner* — Joshua K Ihezie
(74) *Attorney, Agent, or Firm* — Imperium Patent Works; Darien K. Wallace (57) ABSTRACT

A giant foam building block for children includes an inner core, an outer layer and a barrier skin. The inner core is made of foam or expanded polystyrene having a lower density than the outer layer. The inner core is softer than the outer layer, but both have a hardness less than 20 Shore A. A resin is sprayed onto the inside surface of a mold before the inner core is placed in the mold and the outer layer is molded around the inner core. The outer layer is molded such that an integral skin forms on the inner surface of the mold. The resin attaches to the integral skin and together forms a barrier skin that becomes the outer surface of the block. The block has no covering over the barrier skin. Children are not exposed to the TDI-based foam core which is sealed off by the outer layer.

20 Claims, 7 Drawing Sheets

(56) References Cited

U.S. PATENT DOCUMENTS

| | | | |
|---|---|---|---|
| 5,160,772 A * | 11/1992 | Futami et al. | 428/71 |
| 5,658,179 A * | 8/1997 | Glydon et al. | 441/74 |
| 5,744,231 A * | 4/1998 | Igarashi et al. | 428/318.6 |
| 5,904,970 A * | 5/1999 | Lauer et al. | 428/71 |
| 6,022,205 A * | 2/2000 | Marlowe | 425/4 C |
| 6,190,486 B1 * | 2/2001 | Switlik | 156/213 |
| 7,083,173 B2 * | 8/2006 | Lehr et al. | 280/28.16 |
| 7,670,202 B2 * | 3/2010 | Yeh | 441/65 |
| 8,141,957 B2 * | 3/2012 | McClung et al. | 297/452.27 |
| 2003/0175497 A1 * | 9/2003 | Kobe et al. | 428/317.9 |
| 2005/0278852 A1 * | 12/2005 | Wahrmund et al. | 5/636 |
| 2008/0292830 A1 * | 11/2008 | Greer | 428/71 |
| 2009/0224563 A1 * | 9/2009 | Gregory | 296/1.07 |
| 2011/0192564 A1 * | 8/2011 | Mommer et al. | 165/10 |

\* cited by examiner (PRIOR ART)
FIG. 1

GIANT CHILDREN'S FOAM BLOCKS MOLDED AROUND A RIGID INNER CORE

CROSS REFERENCE TO RELATED APPLICATION

This application is a continuation-in-part of, and claims priority under 35 U.S.C. § 119 from Chinese Patent Application No. 20140031361.2, filed on Jan. 23, 2014, in China, the contents of which are incorporated herein by reference.

TECHNICAL FIELD

The present invention relates generally to children's building blocks and, more particularly, to giant kids' blocks made by molding an outer layer of foam around an inner core of molded foam.

BACKGROUND

Giant foam blocks are popular toys for small children. The size of these oversized kids blocks is a significant portion of the size of the child, for example even more than a quarter of the height of the child. Children do not develop finger dexterity with these blocks but rather problem-solving skills by discovering how to match and stack the blocks to build various structures. Because the blocks are a significant portion of the child's size, it is important for the blocks to be light weight. Consequently, the giant kids' blocks are typically made of standard foam, such as the foam used to make a mattress. A vinyl fabric covering is then sewn around the foam shapes.

Figure 1:
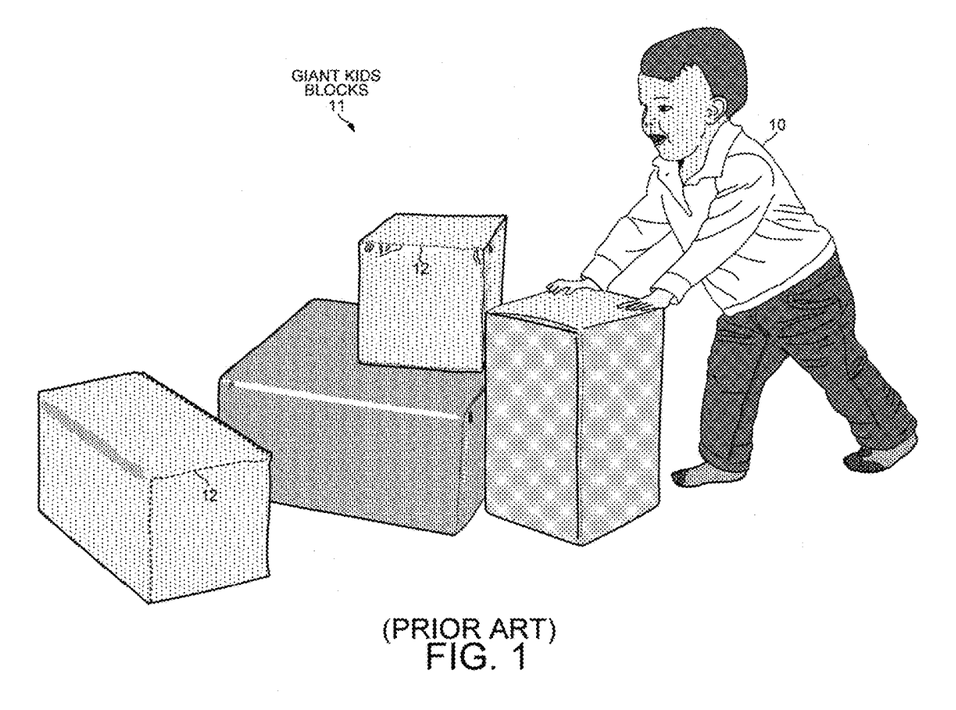
FIG. 1 (prior art) shows a child playing with giant kids' blocks.

FIG. 1 (prior art) shows a child 10 playing with giant kids' blocks 11. Children play with giant blocks 11 in classrooms, day care centers and waiting rooms instead of at home because the blocks usually cost more than the typically family's toy budget will allow. Sewing on the vinyl fabric covering increases the cost of making the blocks. Another disadvantage of the vinyl covering is the uneven seams 12 at the locations where the vinyl material is sewn together. Parent often avoid buying giant foam blocks that do not have a vinyl covering because toddlers tend to chew on the soft foam thereby ingesting some of the foam and in the process destroying the blocks.

A method is sought for making inexpensive yet light weight giant foam building blocks for children that do not have vinyl fabric coverings.

SUMMARY

A light-weight, durable and inexpensive giant foam building block for children includes an inner core, an outer layer of foam and a barrier skin. In a first embodiment, the inner core is cut from a slab of a first foam having a density of less than 1.5 pounds per cubic foot. The foam of the inner core has a lower density than that of the foam of the outer layer. The foam of the inner core is softer than the foam of the outer layer, but both the foam of the inner core and the foam of the outer layer have a hardness of less than 20 Shore A. The foam of the inner core contains between 30 kg and 50 kg of toluene diisocyanate (TDI) for every 100 kg of polyether-derived polyurethane polyol. The outer layer of foam contains between 30 kg and 60 kg of methylene diphenyl diisocyanate (MDI) for every 100 kg of polyurethane polyol. The outer layer of foam is conformally molded around the inner core. A synthetic resin is sprayed onto the inside surface of a mold before the inner core is placed in the mold and the outer layer is molded around the inner core. The outer layer is molded such that an integral skin forms on the inner surface of the mold. The resin attaches to the integral skin and together forms a barrier skin that becomes the outer surface of the children's building block. The block includes no covering over the barrier skin. Children are not exposed to the TDI-based foam of the inner core which is sealed off by the outer layer and the barrier skin.

A second embodiment of a foam building block for children also includes an inner core, an outer layer of foam and a barrier skin. The inner core is made of molded foam or expanded polystyrene having a hardness of greater than 20 Shore A. The outer layer of foam is conformally molded around the inner core and has a hardness of less than 20 Shore A. The polymer material of the inner core has a lower density than that of the foam of the outer layer but yet has a hardness that is greater than that of the foam of the outer layer. A synthetic resin is sprayed onto the inside surface of a mold before the inner core is placed in the mold and the outer layer is molded around the inner core. The outer layer is molded such that an integral skin forms on the inner surface of the mold. The resin attaches to the integral skin and together forms a barrier skin that becomes the outer surface of the block. The block includes no covering over the barrier skin.

The outer layer of foam contains between 30 kg and 60 kg of methylene diphenyl diisocyanate (MDI) for every 100 kg of polyether-derived polyurethane polyol. In the foam embodiment of the inner core, the inner core contains between 100 kg and 120 kg of MDI for every 100 kg of polyurethane polyol. The polymer material of the inner core has a hardness of greater than 20 Shore A and a density of less than two pounds per cubic foot.

A method of manufacturing the first embodiment of the giant foam building block for children includes cutting an inner core from a block of a first foam that has a lower density than the second foam of an outer layer that is molded around the inner core. The first foam is made from a polyether-derived polyurethane polyol and toluene diisocyanate (TDI) and contains between 30 kg and 50 kg of TDI for every 100 kg of polyurethane polyol. The second foam contains between 30 kg and 60 kg of methylene diphenyl diisocyanate (MDI) for every 100 kg of polyurethane polyol. Before the outer layer of the second foam is molded around the inner core, an elastomeric resin is sprayed on the inside surface of the mold into which the inner core is placed. The outer layer is then molded such that an integral skin of the second foam forms near the inner surface of the mold. The resin attaches to the integral skin of the second foam and together forms a barrier skin around the outer layer of the second foam. The barrier skin forms an outer surface of the foam building block.

A method of manufacturing the second embodiment of the giant foam building block for children includes molding an inner core and then molding an outer core around the inner core. The inner core is molded in a first mold from a first foam having a hardness of greater than 20 Shore A and a density of less than 1.5 pounds per cubic foot. An elastomeric resin is sprayed on the inside surface of a second mold before the inner core is placed in the second mold. An outer layer of a second foam is molded around the inner core. The outer layer is molded such that an integral skin of the second foam forms near the inner surface of the second mold. The resin attaches to the integral skin of the second foam and together forms a barrier skin around the outer layer of the second foam. The barrier skin forms an outer surface of the foam building block. In another embodiment, the inner core is made by expanding polystyrene beads in the first mold. The expanded polystyrene (EPS) has a density of less than two pounds per cubic foot.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
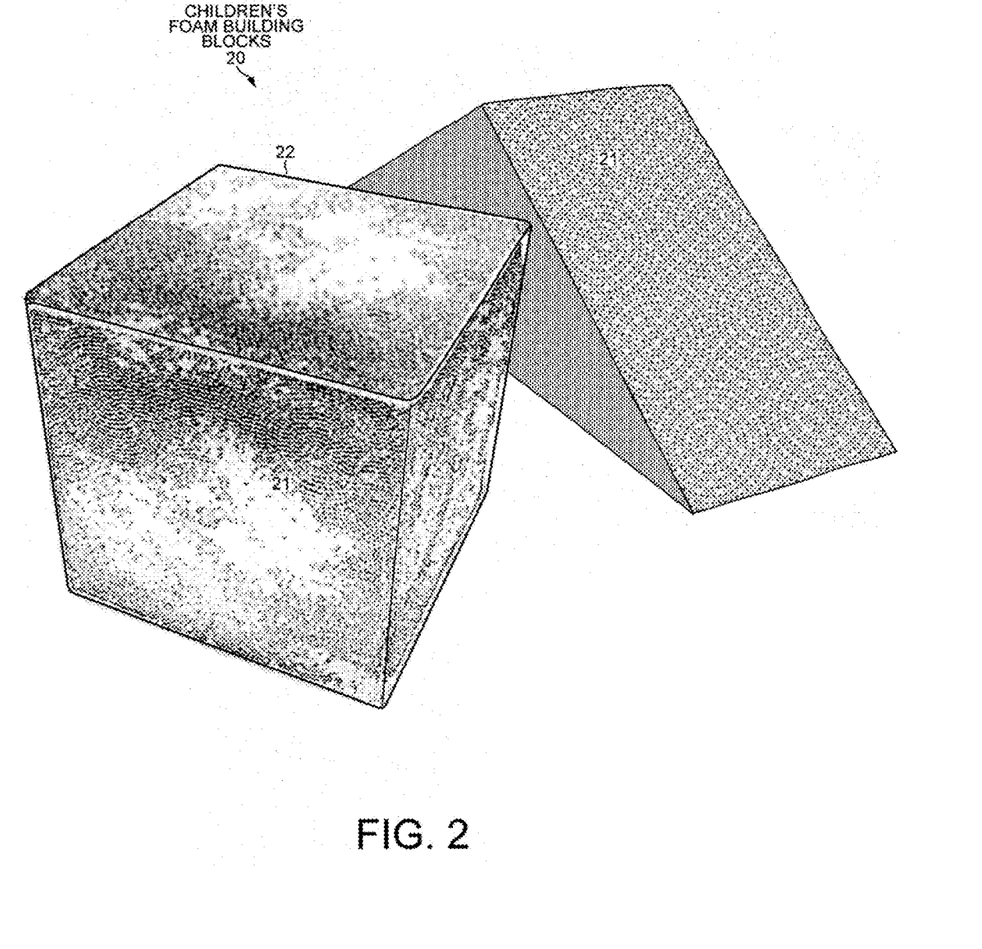
FIG. 2 is a perspective view of giant foam building blocks for children according to the invention.

FIG. 2 shows two giant foam building blocks 20 for children that are light weight, durable and inexpensive to manufacture. Each edge of the giant blocks 20 is at least twenty centimeters long. The building blocks 20 have no separate vinyl or plastic coverings. Instead, a barrier skin of foam forms the outer surface of the blocks. The barrier skin is durable and textured. For example, the textured surfaces 21 of the blocks 20 have dimples arranged in concentric circles.

The building blocks 20 have an outer layer of foam molded around a solid inner core of polymer material. Because the material of the inner core has a lower density than the foam of the outer layer, blocks 20 are lighter weight than conventional blocks made with a single kind of foam. The less dense inner material is less expensive than the foam of the outer layer, which has a softer feel and can form a durable barrier skin. The lower density inner core permits the overall weight of the blocks to be reduced while maintaining the advantages of a heavier, higher-density and more-durable outer layer. Young children are safer playing with lighter blocks that can cause less damage when the blocks are thrown.

In one embodiment, the polymer material of the inner core has a hardness that is greater than that of the foam of the outer layer even though the inner core is made of a lower density polymer material than that of the outer layer. This is possible because lower density foam is not necessarily softer. The advantage of a light weight inner core for children's blocks 20 can be achieved by choosing the lowest density foam that is rigid enough to support the weight of a child and the structures the children build. A sufficiently rigid inner core can be achieved using foam containing between 100 kg and 120 kg of methylene diphenyl diisocyanate (MDI) for every 100 kg of polyether-derived polyurethane polyol. Foam made in this manner can have a hardness of greater than twenty-five on the Shore A scale and yet have a density that is less than one pound per cubic foot. The hardness of rigid foams is typically measured on the Shore A scale, whereas the hardness of soft foams is typically measured on the Shore 00 scale or by the Indentation Force Deflection (IFD). The IFD (25%) measurement is the amount of force in pounds required to push a fifty-square-inch disk down 25% of the total thickness of the foam. A very rigid soft foam has an IFD (25%) of about forty. A rigid foam with a hardness of about 25 Shore A has a hardness of about 76 Shore 00 and a very large but less meaningful IFD. Foam with a hardness of about 20 Shore A has a hardness of about 70 Shore 00.

In this embodiment, a children's foam building block 22 has an inner core made of molded foam with a hardness of greater than 20 Shore A, an outer foam layer with a hardness of less than 20 Shore A molded around the foam core, and a barrier skin that forms an outer surface of the foam block. The inner core is molded into its size and shape rather that being cut from a larger slab that was itself molded.

In another embodiment, the polymer material of the inner core has a lower density than that of the foam of the outer layer. The foam of the inner core is also softer than the foam of the outer layer, but both the foam of the inner core and the foam of the outer layer have a hardness of less than 20 Shore A. The soft, low density foam of the inner core is made of a polyether-derived polyurethane polyol and toluene diisocyanate (TDI). Between 30 kg and 50 kg of TDI is used for every 100 kg of polyurethane polyol.

Figure 3:
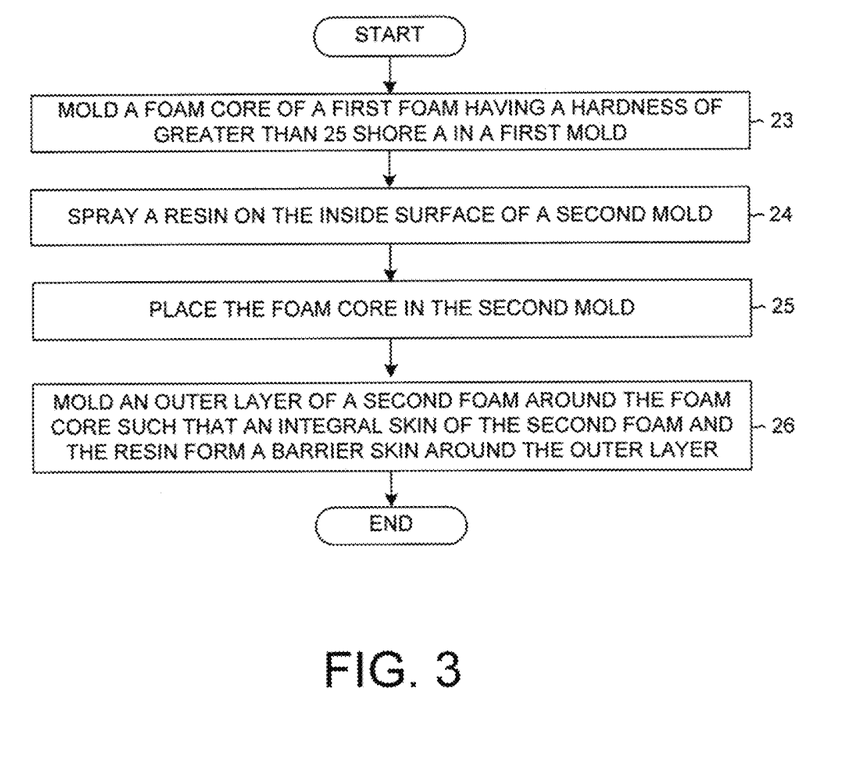
FIG. 3 is a flowchart of steps of a method of manufacturing the foam blocks of FIG. 2.

FIG. 3 is a flowchart illustrating steps 23-26 of a method of manufacturing children's foam building block 22. The method involves molding an inner foam core as well as an outer foam layer around the inner core. In the molding process, a textured barrier skin is formed on the outer surface of the outer foam layer so that no separate covering is required.

Figure 4:
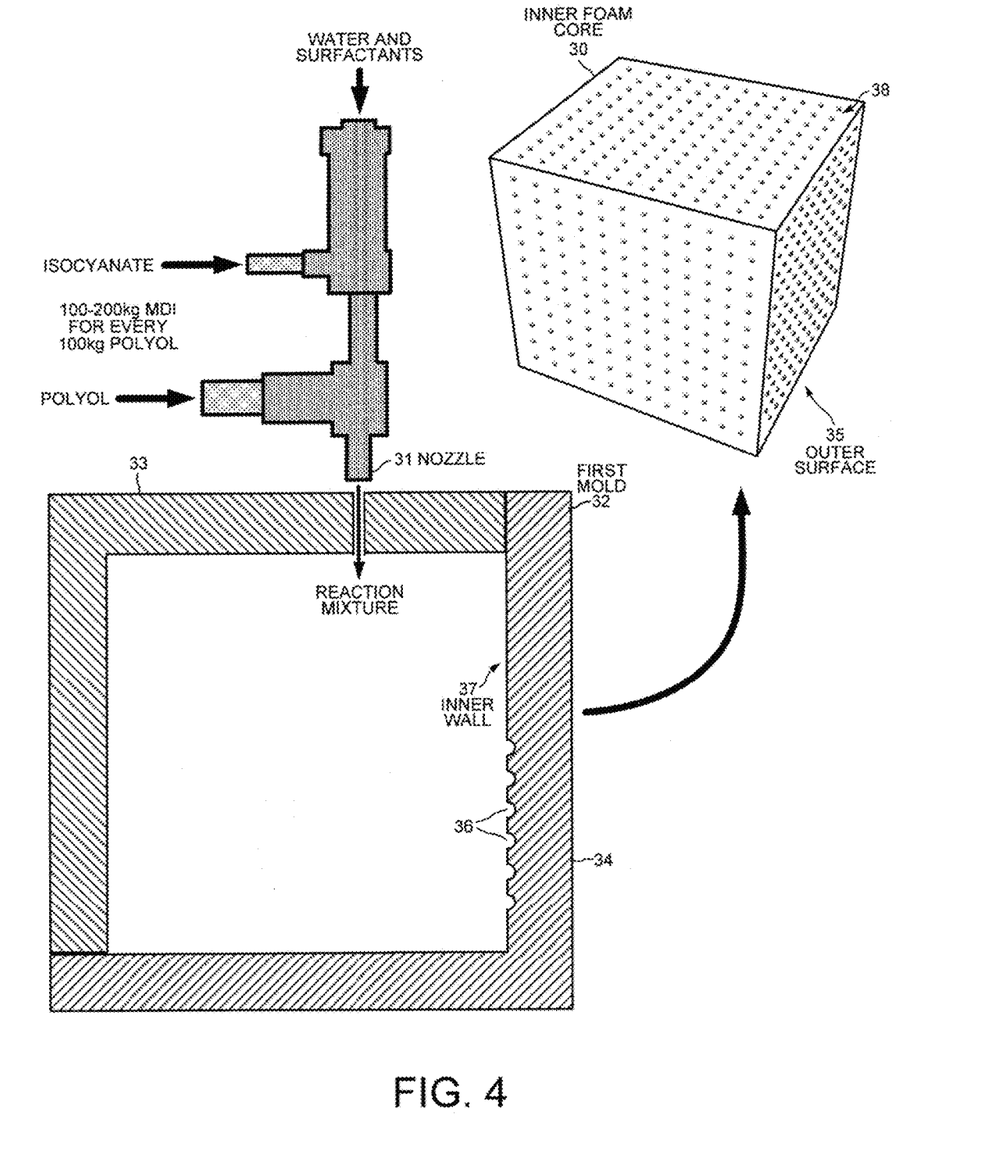
FIG. 4 illustrates the step of molding an inner core having a hardness of greater than twenty on the Shore A scale and a density of less than one pound per cubic foot.

FIG. 4 illustrates a first step 23 in which a foam core 30 is molded from a first foam having a hardness of greater than twenty-five on the Shore A scale and a density of less than one pound per cubic foot. Foam core 30 is made by reacting a polyurethane polyol with a diisocyanate. Polyurethane polyols are typically derived from either polyesters or polyethers and have two or more —$CH_2OH$ functional groups. The diisocyanate used to make polyurethane foams are typically either a toluene diisocyanate (TDI) or a methylene diphenyl diisocyanate (MDI) (also called diphenylmethanediisocyanate). MDI is considered to be less toxic than TDI, and thus MDI is preferable for surfaces of toys that come in contact with children. Increasing the ratio of diisocyanate to polyol in the foam increases the stiffness and decreases the elasticity of the foam. In one embodiment, foam core 30 is made of a polyether-derived polyurethane polyol and 4,4'-methylene diphenyl diisocyanate (MDI). The polyether-derived polyurethane polyol has a molecular weight between 500 and 800, such as optimally 330. Between 100 kg and 120 kg of MDI is added for every 100 kg of the polyurethane polyol. For example, the ratio of MDI to polyurethane polyol is 110 kg to 100 kg.

In step 23, the polyurethane polyol and the diisocyanate are mixed, and then water and surfactants are added to the reaction mixture to form the first foam. The surfactants aid in mixing incompatible components of the reaction mixture and help to control the size of the gas bubbles and resulting foam cells. The bubbles are formed by $CO_2$ generated in the reaction. The $CO_2$ forms a network of cells, many of whose membranes rupture and leave open cells supported by polymer struts. Adding more water generates more $CO_2$, bigger bubbles, an expanded polymer network and a lower density foam. A low density yet stiff inner core 30 is desired. Enough water is added to create a rigid foam having a density between 15-18 kg/m$^3$ (0.94-1.1 lbs/ft$^3$). The reaction of the diisocyanate with water is exothermic, however, and adding too much water can cause the foam to scorch.

FIG. 4 illustrates the foam raw materials (polyol, isocyanate, water and surfactants) being pumped into a mixing head and being discharged through a nozzle 31 into a first mold 32. First mold 32 has multiple sections, such as a portion 33 and a portion 34. Children's building block 22 is a cube, and portions 33-34 are formed so that no seam between the portions passes through any surface of the cube. The raw materials are allowed to set up in the first mold 32 for about fourteen minutes at 35° C. The resulting molded foam is the inner foam core 30, which is removed from the first mold 32 and cured at room temperature for about twenty-four hours. During the curing process outside of the first mold 32, the exothermic reaction between the water and the diisocyanate is allowed to terminate naturally in order to prevent the physical degradation of the foam. Although children's building block 22 is just a cube, shapes with curved surfaces can easily be made. Inner core 30 is given the same shape as the desired shape of the resulting building block except that core 30 is smaller. The rigid foam of inner foam core 30 has a hardness of at least 20 Shore A and 70 Shore 00. At this extreme hardness, the IFD (also called the indentation load deflection) of the foam is difficult to measure using regular testing equipment. The rigid foam of inner foam core 30 has a density of less then one pound per cubic foot.

In order to improve the bonding between the inner foam core 30 and an outer layer of foam that will be molded around the foam core 30, the outer surface 35 of foam core 30 is made uneven. Dimples, grooves or crevices are formed on outer surface 35 of foam core 30 by providing indentations 36 or ribs on the inner wall 37 of the first mold 32. The foam of the outer layer is then molded into and sets up in the dimples, grooves and crevices and becomes more attached to foam core 30. FIG. 4 shows rows of dimples 38 that have been formed in the outer surface 35 of inner foam core 30.

In an alternative first step 23, foam core 30 is cut rather than being molded. While molding is preferable for blocks with curved surfaces, it is less expensive to cut the shapes of blocks having only planar surfaces, such as the cube form of the inner core 30 shown in FIG. 4. For example, square, rectangular and triangular shaped blocks can be cut from a large slab of foam more quickly than forming similar inner cores through molding. And for blocks with no curved surfaces, there is minimal loss of raw materials in the cutting process. In this alternative first step 23, inner core 30 is cut from a slab of foam made with 30 kg and 50 kg of diisocyanate (TDI) for every 100 kg of polyurethane polyol and having a density of less than 1.5 pounds per cubic foot.

Figure 5:
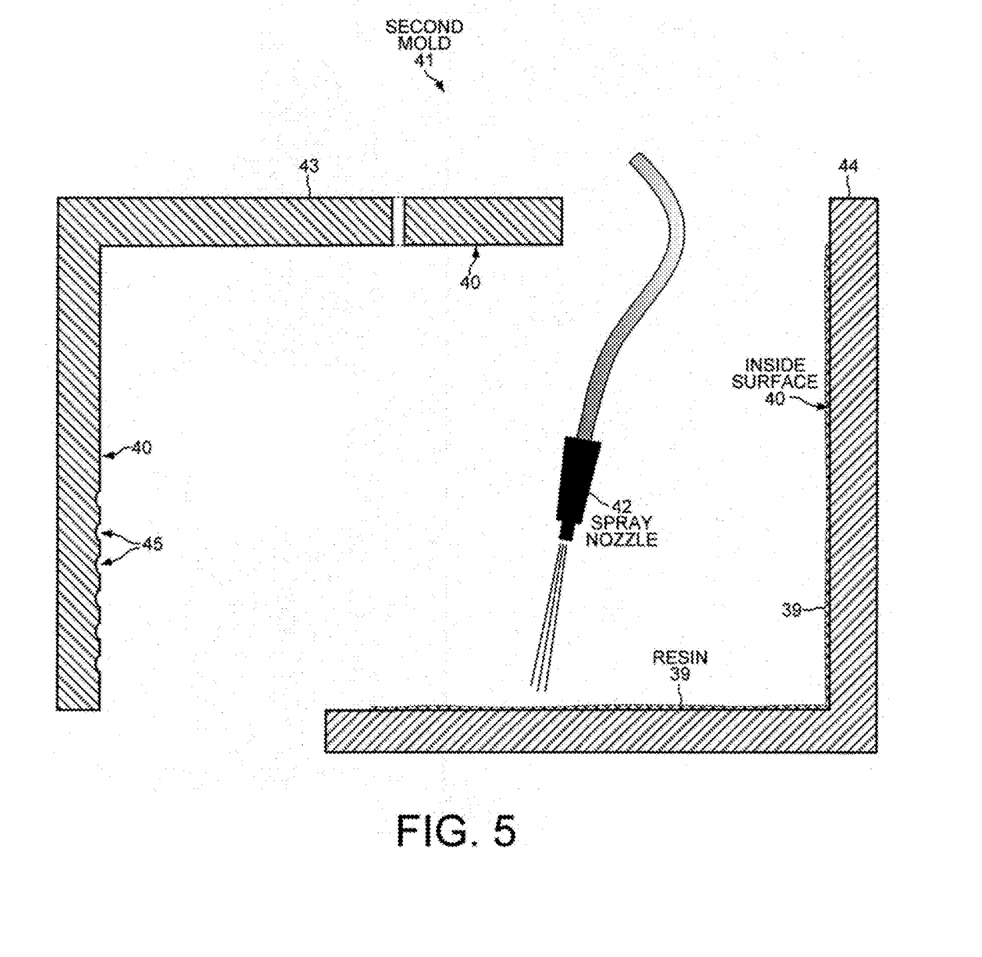
FIG. 5 illustrates the step of applying a thin in-mold coating of resin to the inside surface of a second mold.

In step 24, a synthetic resin 39 is sprayed on an inside surface 40 of a second mold 41 before foam core 30 is placed in the second mold. FIG. 5 shows a thin in-mold coating of resin 39 being applied to inside surface 39 by flowing the resin through a spray nozzle 42 directed toward the inside surface. The layer of resin 39 is about 0.5 mm to 3 mm thick. The movement of spray nozzle 42 can be computer controlled to ensure complete coverage of inside surface 40 and to allow a thicker resin layer to be applied in areas that are more likely to tear. As with first mold 32, second mold 41 also has multiple sections, such as portion 43 and portion 44. Resin 39 can be sprayed on inside surface 40 before portions 43-44 are closed. Any amount of resin that is dispensed onto joint areas of second mold 41 is pressed out of the joint when the mold is closed.

Resin 39 is a polyurethane elastomer that becomes an outer elastomeric barrier skin of the building block 22. In one embodiment, resin 39 includes a polyurethane resin and a pigment that determines the color of the block 22. The substances (by CAS reg. nos.) included in the resin are: 30-40% polyurethane resin 25135-73-3, 20-30% butyl acetate 123-86-4, 15-25% methylethyl ketone 78-93-3, 10-15% pigment and 2-6% methoxypropyl acetate 108-65-6. In the finished building block 22, resin 39 is integral with an outer skin layer of the foam that is molded around foam core 30. The resin is allowed to cure partially before the foam raw materials of the outer layer of foam are injected into second mold 41. However, resin 39 is still tacky when second mold 41 is filled with the foam of the outer layer. Dimples or microbumps are formed on the outer surface of building block 22 by providing indentations 45 on the inside surface 40 of second mold 41. The dimples or microbumps form the texture on the barrier skin of building block 22 and provide a better grip to children playing with block 22.

Figure 6:
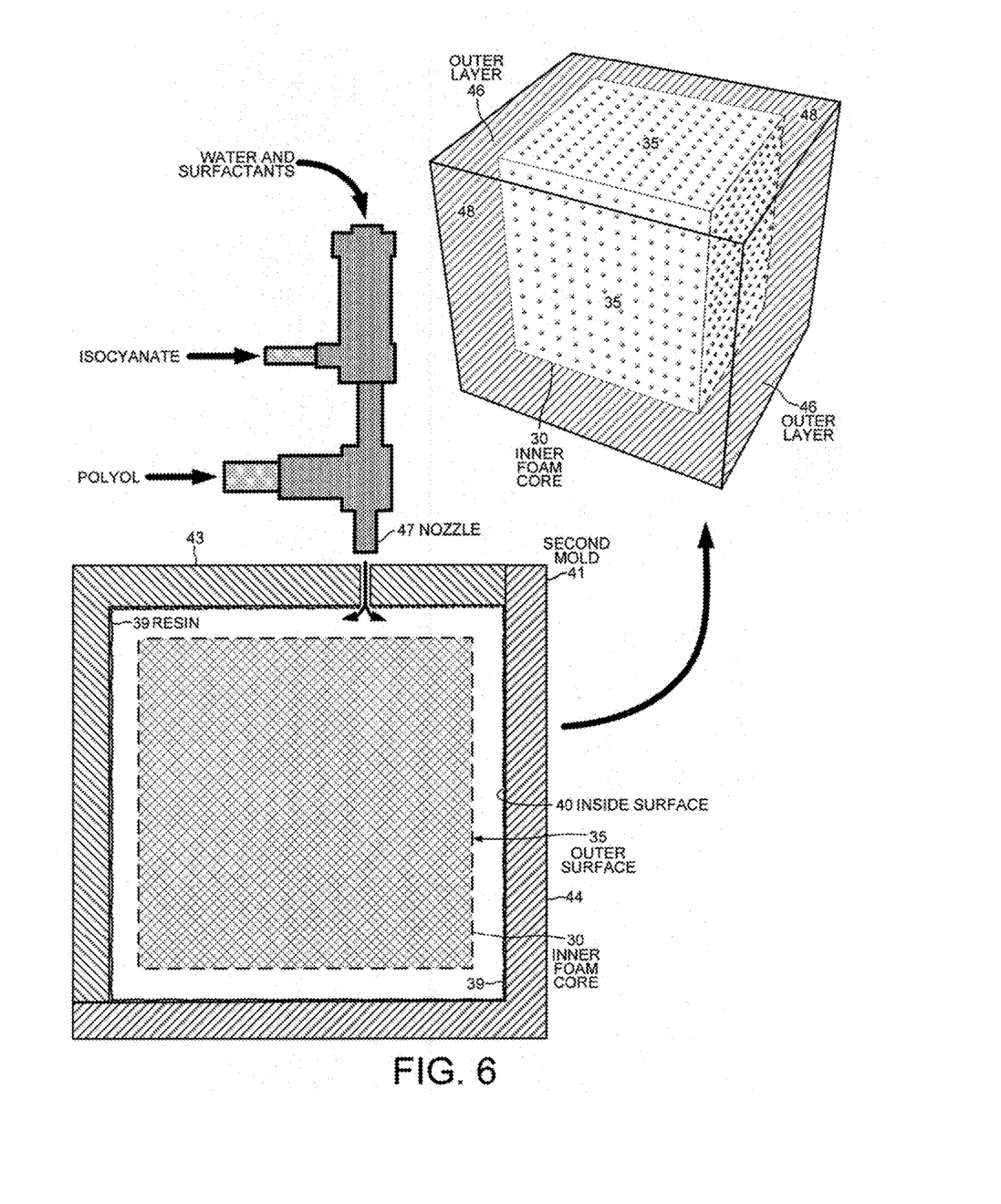
FIG. 6 illustrates the step of molding an outer layer of foam in the space between the inside surface of the second mold and the outer surface of the inner core.

In step 25, inner foam core 30 is placed in second mold 41, as shown in FIG. 6. Foam core 30 is supported inside second mold 41 so that there is a space between the inside surface 40 of second mold 41 and the outer surface 35 of foam core 30. The supports for foam core 30 are not shown in FIG. 6. In one embodiment, the space between inside surface 40 and outer surface 35 is evenly thick so that an outer layer 46 of foam is conformally molded around inner foam core 30.

In step 26, the outer layer 46 of foam is molded from a second foam around the first foam of inner core 30. The outer layer 46 has approximately the same thickness around all surfaces of foam core 30 such that the outer layer is conformally molded around the inner core. For example, outer layer 46 of foam is about 1.5 inches thick on each surface of inner core 30. Outer layer 46 is also made by reacting a polyurethane polyol with a diisocyanate. The second foam of outer layer 46 is made by combining 30-60 kg of monomeric MDI for every 100 kg of polyether-derived polyurethane polyol. Preferably, 55 kg of MDI is used for every 100 kg of polyol. The polyurethane polyol has a molecular weight between 3000 and 5000, such as optimally 4500.

FIG. 6 illustrates the foam raw materials (polyol, isocyanate, water and surfactants) being pumped into a mixing head and being discharged through nozzle 47 into second mold 41 in the space between inside surface 40 and outer surface 35 of foam core 30. The raw materials are allowed to set up in second mold 41 for about 8-10 minutes at 40-55° C. The foaming pressure causes the polyol with the high molecular weight (4500) to condense more towards the outside of the available expansion volume and presses the foam into the layer of resin 39. Accordingly, the foam of outer layer 46 has a lower density towards the inside and a higher density towards the outside near inside surface 40 of second mold 41. The higher density foam with few bubbles forms an integral skin with a density of 10-20 pounds per cubic foot. The layer of resin 39 attaches to the integral skin. The integral skin of outer layer 46 and the resin 39 together form a barrier skin 48 around outer layer 46 that is resistant to abrasion, exhibits low water absorption and has a high tear strength. It is difficult for a child to bite through the barrier skin 48.

The resulting outer foam layer 46 around inner foam core 30 is then removed from second mold 41 and allowed to cure at room temperature. The softer foam of outer foam layer 46 has a hardness of less than 20 Shore A or 33 Shore 00. In one embodiment, outer foam layer 46 is "high density" (HD) polyurethane foam having a density between 1.5 to 2.5 pounds per cubic foot and an IFD (25%) of about fifteen. In other embodiments, outer foam layer 77 is memory foam or natural latex foam.

Figure 7:
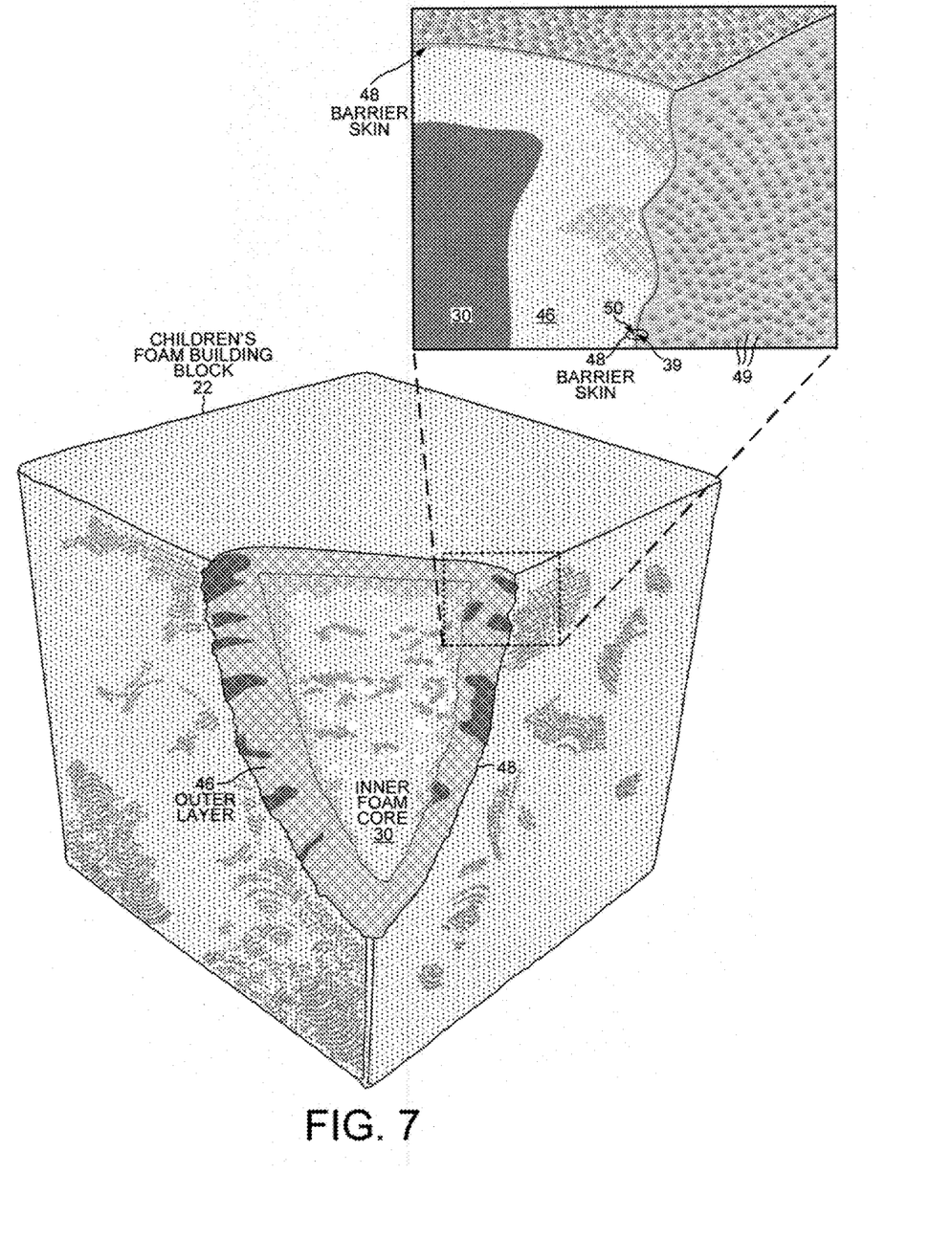
FIG. 7 is a perspective view of a foam building block of FIG. 2 with a corner sliced off to reveal the inner layers in more detail.

FIG. 7 shows children's foam building block 22 with a corner sliced off to reveal the inner layers in more detail. FIG. 7 also includes an expanded view of a portion of the sliced area that shows the textured barrier skin 48 in yet more detail. Microbumps 49 provide the texture to the barrier skin 48. The barrier skin 48 has the elastomeric resin layer 39 on the outside and the integral skin 50 of outer layer 46 on the inside. In block 22, the outer layer 46 is 1-2 inches thick. FIG. 7 shows that the inner foam core 30 is completely encapsulated by the outer layer 46 of molded foam. Moreover, the barrier skin 48 provides an additional insulation from the inner core 30. The molded outer layer 46 and barrier skin 48 permit the relatively less expensive TDI-based foam to be used in the children's building blocks despite the higher toxicity of TDI-based foam relative to MDI-based foam. Without the molded foam layer and barrier that seal off the toluene diisocyanate (TDI), using TDI in children's toys would not be feasible.

In another embodiment, inner core 30 is made of expanded polystyrene (EPS) instead of polyurethane foam. The expanded polystyrene is a white rigid material made by expanding polystyrene beads with steam and bonding the beads together under pressure in a mold, such as first mold 32 that is capable of maintaining the internal pressure. Inner core 30 is not made from extruded polystyrene (Styrofoam®). The expanded polystyrene has a density of less than two pounds per cubic foot and a hardness of more than 20 Shore A. The expanded polystyrene has a compressive resistance at 1% strain of about 10 pounds per square inch (psi). The outer layer 46 of foam is then molded around the inner core 30 of expanded polystyrene in the same manner as foam is molded around the inner core of the first foam in step 26. The inner core of expanded polystyrene (EPS) is somewhat heavier than an inner core of rigid polyurethane foam that provides the same strength and support for outer layer 46.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A block for children comprising:
   an inner core of foam;
   an outer layer of foam molded around the inner core, wherein the foam of the outer layer has a higher density than the foam of the inner core; and
   a barrier skin that forms an outer surface of the block, wherein the barrier skin is integrally formed with the outer layer of foam.

2. The block of claim 1, wherein the foam of the inner core is softer than the foam of the outer layer, and wherein both the foam of the inner core and the foam of the outer layer have a hardness of less than 20 Shore A.

3. The block of claim 1, wherein the outer layer of foam contains between 30 kg and 60 kg of methylene diphenyl diisocyanate (MDI) for every 100 kg of polyurethane polyol.

4. The block of claim 1, wherein the barrier skin has a textured outer surface.

5. The block of claim 1, wherein the inner core is made of a polyether-derived polyurethane polyol and toluene diisocyanate (TDI), and has a density of less than 1.5 pounds per cubic foot.

6. The block of claim 5, wherein the inner core contains between 30 kg and 50 kg of TDI for every 100 kg of polyurethane polyol.

7. The block of claim 1, wherein the block includes no covering over the barrier skin.

8. The block of claim 1, wherein the foam of the inner core is taken from the group consisting of: molded foam and foam cut from a foam block.

9. A building block for children comprising:
   an inner core made of a polymer material;
   an outer layer of foam conformally molded around the inner core, wherein the polymer material of the inner core has a lower density than that of the foam of the outer layer; and
   a barrier skin that forms an outer surface of the block, wherein the barrier skin is integrally formed with the outer layer of foam.

10. The block of claim 9, wherein the polymer material is made of a polyether-derived polyurethane polyol and toluene diisocyanate (TDI).

11. The block of claim 10, the polymer material contains between 30 kg and 50 kg of TDI for every 100 kg of polyurethane polyol.

12. The block of claim 10, wherein the polymer material has a density of less than 1.5 pounds per cubic foot.

13. The block of claim 9, wherein the polymer material is expanded polystyrene (EPS).

14. The block of claim 13, wherein the expanded polystyrene (EPS) has a density of less than two pounds per cubic foot.

15. The block of claim 9, wherein the outer layer of foam contains between 30 kg and 60 kg of methylene diphenyl diisocyanate (MDI) for every 100 kg of polyurethane polyol.

16. The block of claim 9, wherein the outer layer of foam contains methylene diphenyl diisocyanate (MDI) and polyurethane polyol.

17. A method of making a block for children comprising:
   cutting an inner core from a slab of a first foam having a density of less than two pounds per cubic foot;
   placing the inner core in a mold;
   molding an outer layer of a second foam around the inner core, wherein the second foam has a density of two pounds per cubic foot or more, and wherein the outer layer is molded such that an integral skin of the second foam forms near an inner surface of the mold; and
   spraying a resin on an inside surface of the mold before placing the inner core in the mold, wherein the resin attaches to the integral skin of the second foam and together integrally forms a barrier skin around the outer layer of the second foam.

18. The method of claim 17, wherein the first foam is made from a polyether-derived polyurethane polyol and toluene diisocyanate (TDI), and wherein the first foam contains between 30 kg and 50 kg of TDI for every 100 kg of polyurethane polyol.

19. The method of claim 17, wherein the second foam contains between 30 kg and 60 kg of methylene diphenyl diisocyanate (MDI) for every 100 kg of polyurethane polyol.

20. The method of claim 17, wherein the inner core has a density of less than 1.5 pounds per cubic foot.

* * * * *